US006807865B2

(12) United States Patent
Troyer

(10) Patent No.: US 6,807,865 B2
(45) Date of Patent: Oct. 26, 2004

(54) PRESSURE SENSOR WITH A RADIALLY TENSIONED METAL DIAPHRAGM

(75) Inventor: Terrence J. Troyer, Laporte, IN (US)

(73) Assignee: Dwyer Instruments, Inc., Michigan, IN (US)

(*) Notice: Subject to any disclaimer, the term of this patent is extended or adjusted under 35 U.S.C. 154(b) by 208 days.

(21) Appl. No.: 10/067,033

(22) Filed: Feb. 4, 2002

(65) Prior Publication Data

US 2003/0145656 A1 Aug. 7, 2003

(51) Int. Cl.[7] .................................................. G01L 7/08
(52) U.S. Cl. .................................. 73/715; 92/90; 92/96
(58) Field of Search ........................ 73/700–756; 92/89, 92/90, 96

(56) References Cited

U.S. PATENT DOCUMENTS

| | | | |
|---|---|---|---|
| 3,793,885 A | | 2/1974 | Frick |
| 3,800,413 A | * | 4/1974 | Frick ........................ 29/592.1 |
| 4,158,311 A | | 6/1979 | Yasuhara et al. |
| 4,265,389 A | | 5/1981 | Mastromatteo |
| 4,358,814 A | * | 11/1982 | Lee et al. ................. 361/283.4 |
| 4,823,603 A | | 4/1989 | Ferran et al. |
| 5,038,459 A | | 8/1991 | Yasuda et al. |
| 5,442,962 A | | 8/1995 | Lee |
| 5,623,102 A | | 4/1997 | Arndt et al. |
| 6,014,800 A | | 1/2000 | Lee |
| 6,019,002 A | | 2/2000 | Lee |

FOREIGN PATENT DOCUMENTS

DE 4233691 4/1994

OTHER PUBLICATIONS

AK Steel Stainless Steels web page, AK Steel Corporation, Nov. 17, 2001.
430 Stainless Steel Product Data Sheet, AK Steel Corporation, Feb. 20, 2001.
17–4PH Stainless Steel Product Data Sheet, AK Steel Corporation, Mar. 16, 2001.
17–7PH Stainless Steel Product Data Sheet, AK Steel Corporation, Nov. 1, 1999.
17–4PH Stainless Steel Product Data Bulletin, AK Steel Corporation, Mar. 31, 2000.
17–7PH Stainless Steel Product Data Bulletin, AK Steel Corporation, Nov. 1, 1999.
Carpenter Stainless Type 405 Product Sheet.

* cited by examiner

Primary Examiner—Edward Lefkowitz
Assistant Examiner—Alandra Ellington
(74) Attorney, Agent, or Firm—Barnes & Thornburg

(57) ABSTRACT

A pressure sensor having a radially tensioned diaphragm for measuring fluid pressure. The pressure sensor includes a first generally concave metal body member and a second generally concave metal body member, and a radially tensioned flexible metal diaphragm located therebetween that is tensioned by heating the sensor. The first and second body members are formed from a material having a coefficient of thermal expansion in the range of approximately 0.0000056 inch/inch/° F. to 0.0000064 inch/inch/° F. The diaphragm is formed from a precipitation hardening metal material having a coefficient of thermal expansion of approximately 0.0000060 inch/inch/° F. The first body member and the second body member are formed from a ferromagnetic metal material such that the first and second body members shield the diaphragm from magnetic fields which may otherwise cause movement of the diaphragm.

20 Claims, 4 Drawing Sheets

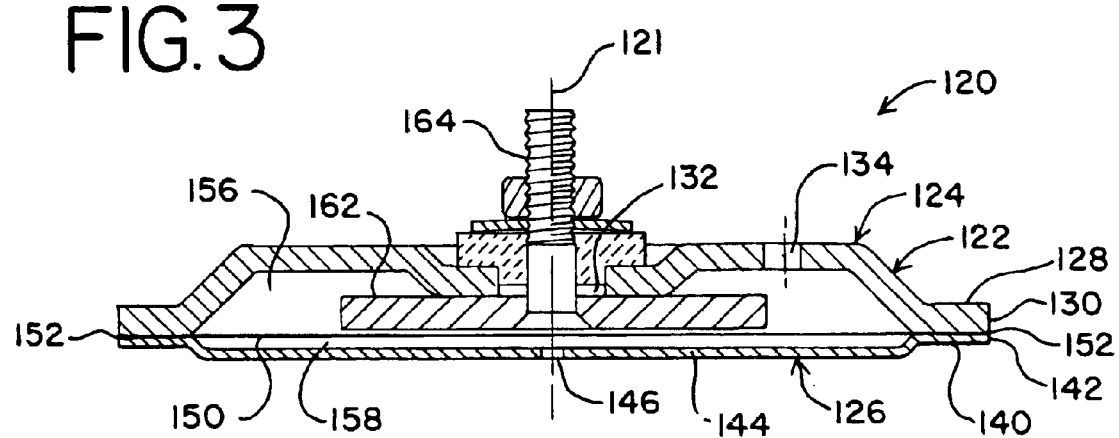
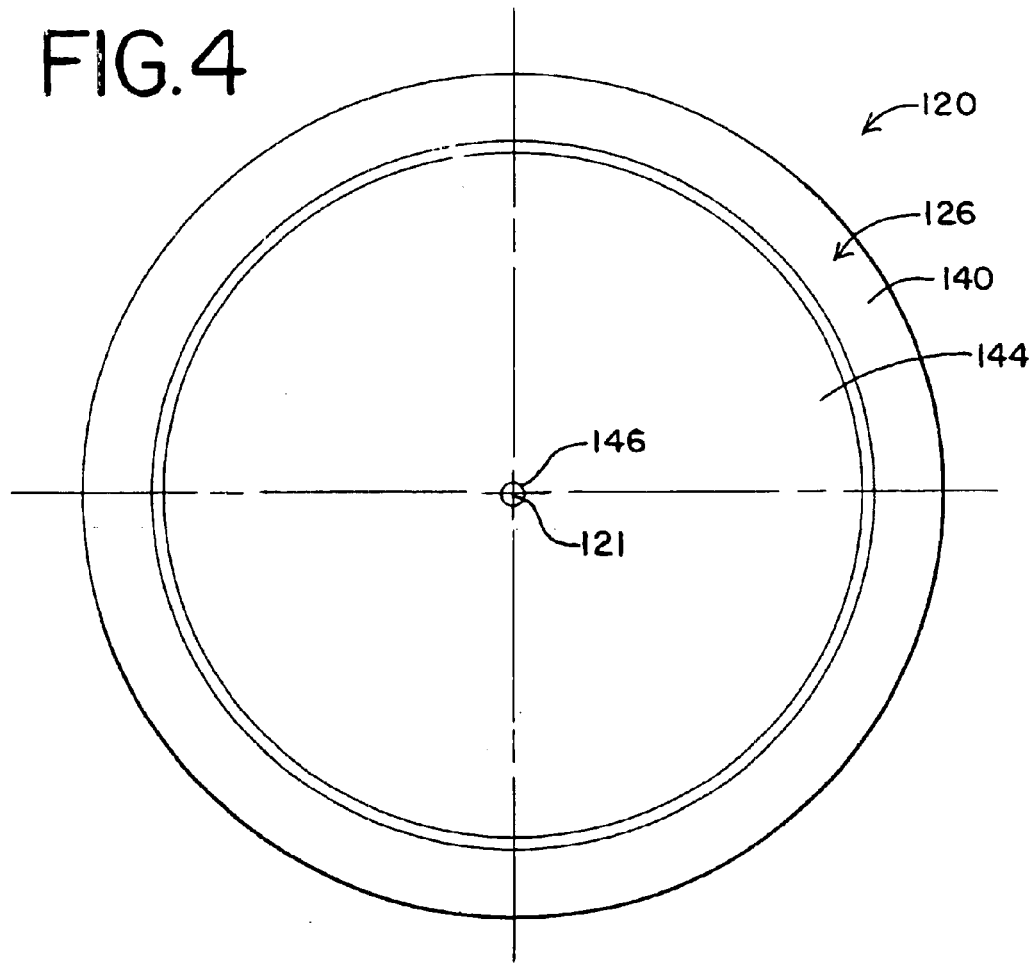

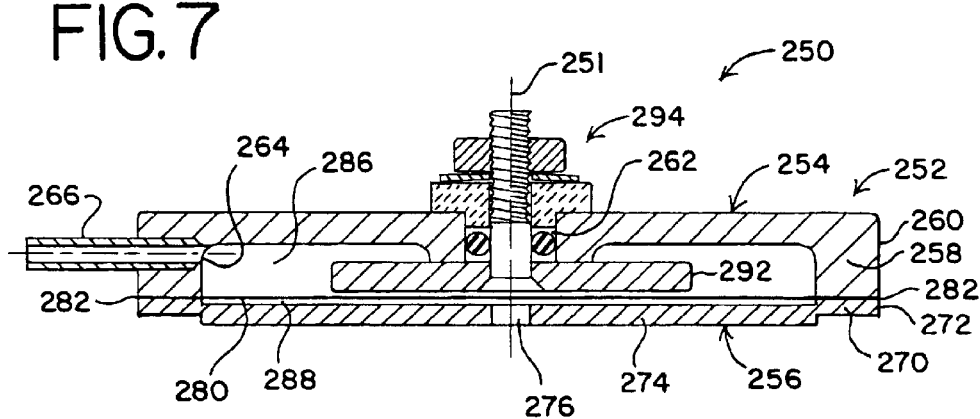
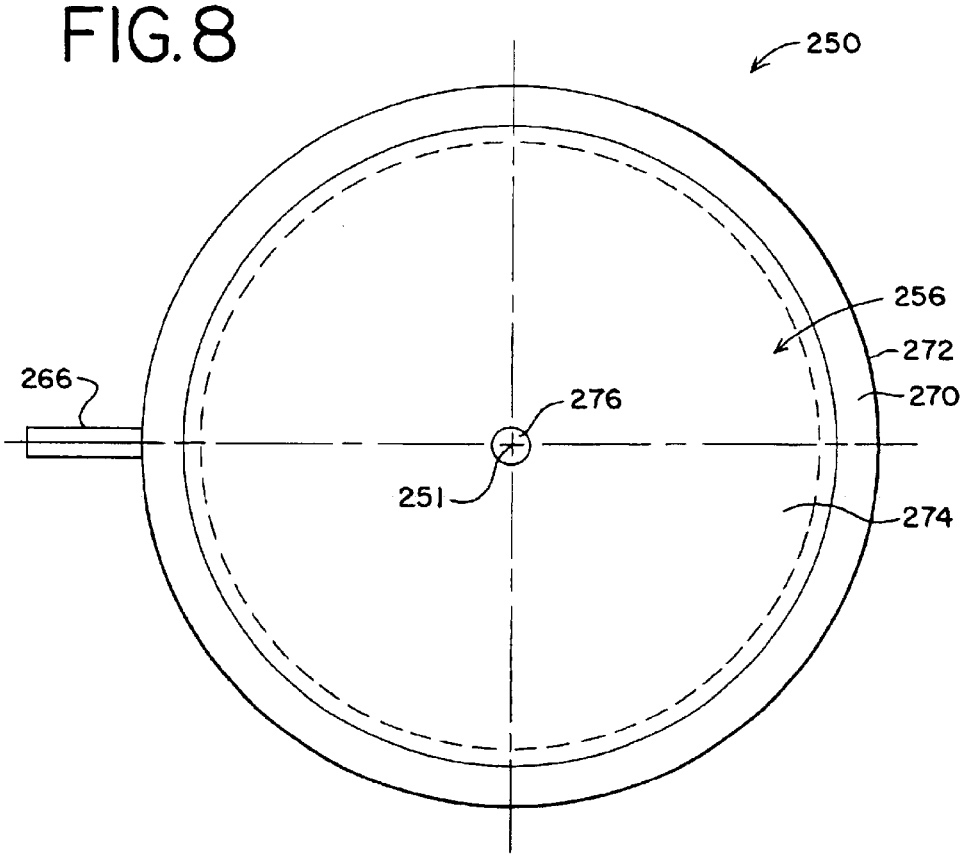

PRESSURE SENSOR WITH A RADIALLY TENSIONED METAL DIAPHRAGM

BACKGROUND OF THE INVENTION

The present invention is directed to a pressure sensor for measuring fluid pressure, and in particular to a pressure sensor including a housing having a first body member and a second body member and a radially tensioned flexible diaphragm disposed between the first and second body members, wherein the material that forms the first and second body members is matched to the material that forms the diaphragm such that the coefficients of thermal expansion of the materials are compatible with one another.

Pressure sensors have previously included body members and a metal diaphragm sandwiched between the body members. The metal diaphragm has been radially tensioned by radially expanding the diameter of the diaphragm as disclosed in U.S. Pat. No. 6,019,002. The metal diaphragm has also been radially tensioned by forming the diaphragm from a precipitation hardenable metal and subjecting the precipitation hardenable metal in an annealed condition (A) to an aging treatment at high temperatures ranging from about 500 degrees to 600 degrees Celsius (C.) for one hour whereby the precipitation hardenable material contracts and radially tensions the diaphragm as disclosed in U.S. Pat. No. 4,158,311.

It has been found that if the coefficient of thermal expansion (Tc) of the metal material that forms the body members of the sensor does not sufficiently closely match the coefficient of thermal expansion of the metal material that forms the diaphragm, the diaphragm can experience a high radial tensile stress during heat treating that can exceed the yield stress of the material that forms the body members. Consequently, the body members will yield and thereby release the radial tension in the diaphragm that was created by the heat treatment process, resulting in zero net radial tension in the diaphragm at ambient temperatures. In addition, during use, a sufficient mismatch between the coefficients of thermal expansion of the material that forms the body members, and of the material that forms the diaphragm, causes a change in the diaphragm radial tensile stress as the temperature of the sensor changes, thereby causing a direct change or error in the pressure reading at Span (at full scale pressure). The metal diaphragm may also be moved by magnetic fields, as opposed to changes in pressure, thereby providing an inaccurate pressure reading. The present invention overcomes these problems in the prior art.

SUMMARY OF THE INVENTION

A pressure sensor for measuring fluid pressure. The pressure sensor includes a housing having a first generally concave metal body member and a second generally concave metal body member. A radially tensioned flexible metal diaphragm is disposed between the first body member and the second body member. The first body member and the diaphragm form a first fluid chamber and the second body member and the diaphragm form a second fluid chamber. The first and second body members are formed from a first material having a first coefficient of thermal expansion, and the diaphragm is formed from a second material having a second coefficient of thermal expansion. The first coefficient of thermal expansion of the body member metal is not greater than the second coefficient of thermal expansion of the diaphragm metal more than by approximately 0.0000015 inch/inch/° F. The second coefficient of thermal expansion of the second material that forms the diaphragm is preferably approximately 0.0000060 inch/inch/° F. The first coefficient of thermal expansion of the first material that forms the body members is preferably in the range of approximately 0.0000056 inch/inch/° F. to 0.0000064 inch/inch/° F. The first body member and the second body member may be formed from a ferromagnetic material such that the first and second body members shield the diaphragm from magnetic fields which may otherwise cause movement of the diaphragm which results in inaccurate measurement of fluid pressure.

BRIEF DESCRIPTION OF THE DRAWING FIGURES

FIG. 3 is a cross sectional view of another embodiment of the pressure sensor of the present invention including a single electrode.

FIG. 4 is a bottom view of the pressure sensor of FIG. 3.

FIG. 7 is a cross sectional view of another embodiment of the pressure sensor of the present invention including a single electrode.

FIG. 8 is a bottom view of the pressure sensor of FIG. 7.

DETAILED DESCRIPTION OF THE PREFERRED EMBODIMENTS

Figure 1:
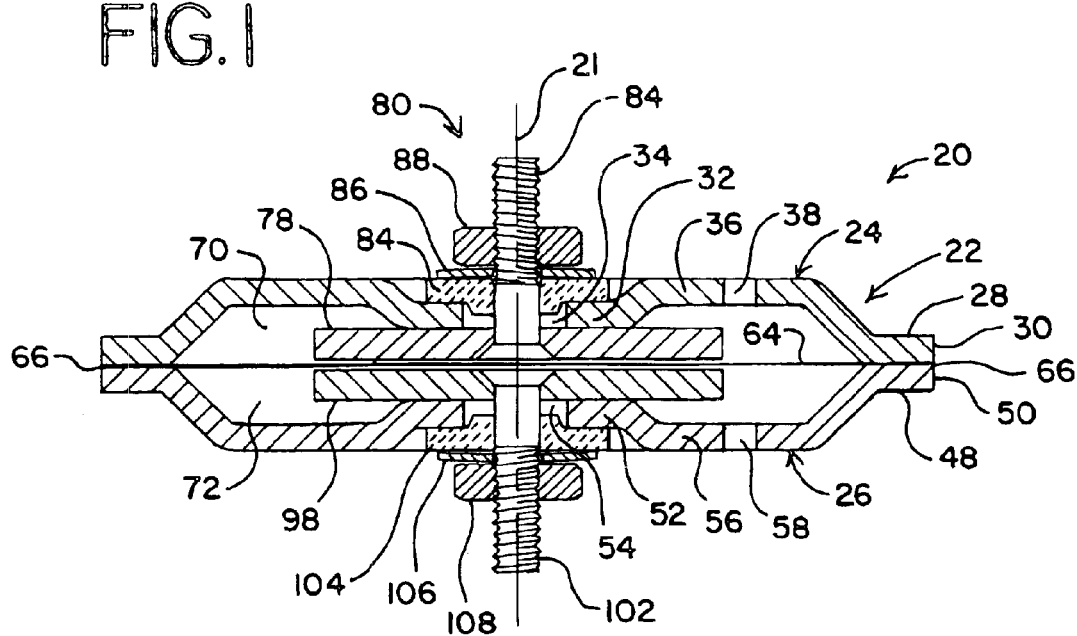
FIG. 1 is a cross sectional view of a pressure sensor of the present invention including two electrodes.
Figure 2:
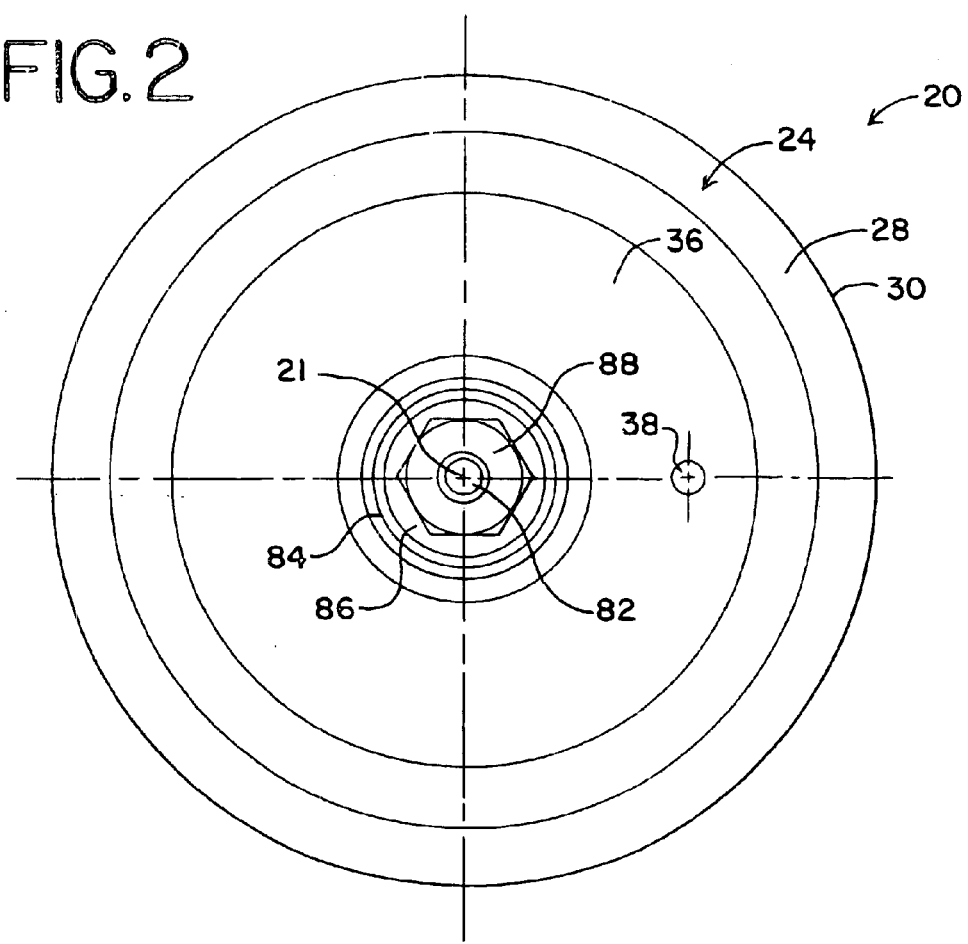
FIG. 2 is a top plan view of the pressure sensor of FIG. 1.

FIGS. 1 and 2 show one embodiment of the pressure sensor 20 of the present invention. The pressure sensor 20 includes a central axis 21 and a housing 22. The housing 22 includes a generally concave first body member 24 and a generally concave second body member 26. The first and second body members 24 and 26 are formed substantially identical to one another. The body members 24 and 26 are formed from the same type of metal and are stamped from metal plates into their final form. The first body member 24 includes a generally annular flange 28 which includes a generally circular peripheral edge 30. The first body member 24 also includes a planar and generally circular central disc 32 having a circular central aperture 34. The first body member 24 also includes a wall portion 36 that is located concentrically about the central disc 32 and that extends between the central disc 32 and the annular flange 28. The first body member 24 includes a port 38 that extends through the wall portion 36. The annular flange 28, the central disc 32, and the wall portion 36 are located in respective planes that are generally parallel to one another.

The second body member 26 includes a generally annular flange 48 having a generally circular peripheral edge 50. The second body member 26 also includes generally circular and planar central disc 52 having a generally circular central aperture 54. The second body member 26 also includes a generally planar wall portion 56 that extends generally concentrically about the central disc 52 and that extends between the central disc 52 and the annular flange 48. The second body member 26 includes a port 58 that extends through the wall portion 56.

The pressure sensor 20 includes a generally planar and flexible thin metal diaphragm 64 which includes a generally circular peripheral edge 66. The diaphragm 64 is disposed between the first body member 24 and the second body member 26 such that the annular flange 28 of the first body member 24 engages a first side of the diaphragm 64 and the annular flange 48 of the second body member 26 engages a second side of the diaphragm 64. The peripheral edge 66 of the diaphragm 64 is located adjacent the peripheral edge 30 of the annular flange 28 and the peripheral edge 50 of the annular flange 48 around the entire perimeter of the diaphragm 64. The peripheral edge 66 of the diaphragm 64 is attached to the annular flanges 28 and 48 of the body members 24 and 26 around the perimeter of the diaphragm 64 by welding or the like such that a fluid-tight seal is created between the annular flanges 28 and 48 and the diaphragm 64. The pressure sensor 20 includes a first chamber 70 located between the first body member 24 and the diaphragm 64. The first chamber 70 is in fluid communication with the port 38. The pressure sensor 20 also includes a second chamber 72 which is located between the second body member 26 and the diaphragm 64. The second chamber 72 is in fluid communication with the port 58.

The pressure sensor 20 includes a first metalized ceramic electrode 78 located in the first chamber 70. The first electrode 78 is attached to the first body member 24 by a mounting arrangement 80. A first generally planar surface of the electrode 78 engages the central disc 32 of the first body member 24 and a second generally planar surface of the first electrode 78 is spaced apart a short distance from, and generally parallel to, the diaphragm 64. The mounting arrangement 80 includes a mounting stud 82 such as a bolt having a head at one end which is adapted to engage the first electrode 78 and a threaded portion at a second end. The mounting stud 82 extends through the first electrode 78 and through the central aperture 34 in the first body member 24. A ceramic bushing 84 is located adjacent the outer surface of the central disc 32 of the first body member 24. The ceramic bushing 84 includes a central aperture through which the stud 82 extends. A spring washer 86 includes a central aperture through which the stud 82 extends. The spring washer 86 is located adjacent the outer surface of the ceramic bushing 84. A threaded fastener 88 such as a nut is threadably attached to the threaded end of the mounting stud 82. The nut 88 compresses the spring washer 86 and compresses the first electrode 78 and the ceramic bushing 84 against the central disc 32 of the first body member 24. The mounting stud 82 is in electrical communication with the first electrode 78.

The pressure sensor 20 also includes a second metallized ceramic electrode 98. The second electrode 98 is located in the second chamber 72 such that a first generally planar surface of the electrode 98 is located adjacent the central disc 52 and a second generally planar surface of the electrode 98 is spaced a short distance apart from, and generally parallel to, the diaphragm 64. The diaphragm 64 is thereby located between the first and second electrodes 78 and 98. The second electrode 98 is attached to the second body member 26 by a mounting arrangement 100 which is identical to the mounting arrangement 80. The mounting arrangement 100 includes a mounting stud 102, a ceramic bushing 104, a spring washer 106 and a fastener 108. The mounting arrangement 100 attaches the second electrode 98 to the second body member 26 in the same manner as the mounting arrangement 80 attaches the first electrode 78 to the first body member 24. The mounting stud 102 is in electrical communication with the second electrode 98.

The port 38 is adapted to placed in fluid communication with a supply of a first fluid and the port 58 is adapted to be placed in fluid communication with a supply of a second fluid. The electrodes 78 and 98 are adapted to sense movement of the diaphragm 64 in a direction generally parallel to the axis 21 which is indicative of the differential pressure between the pressure of the first fluid, such as a gas, within the first chamber 70 and the pressure of the second fluid, such as a gas, within the second chamber 72.

The diaphragm 64 may be made from 17-4 precipitation hardening stainless steel (PHSS) metal material. The 17-4 PHSS material will shrink approximately 0.0006 inches/inch when converted from the annealed condition (A) to the H900 condition by heat treating the material at 900° Fahrenheit (F.) for one hour, and then air cooling the material. The residual radial stress in the diaphragm 64 after heat treating the sensor 20 is equal to the tensile strain (0.0006 inches/inch for the H900 condition) multiplied by Young's Modulus of Elasticity (E) for the 17-4PHSS material ($E=28.5\times10^6$ pounds per square inch). The resulting radial stress in the diaphragm 64 is therefore equal to 17,100 pounds per square inch (psi) after heating the sensor 20 to 900° F.

If the metal material forming the body members 24 and 26 does not have a coefficient of thermal expansion (Tc) that closely matches the Tc of the diaphragm material, the body members 24 and 26 may expand too much at the 900° F. heat treating temperature, such that the diaphragm 64 can experience a high radial tensile stress that can exceed the yield stress of the material of the body members 24 and 26. The release or yielding of the body members 24 and 26 results in zero net radial tension in the diaphragm 64 when the sensor 20 is at ambient temperature. The Tc of 17-4 PHSS at 900° F. is $6.6\times10^{-6}$ (0.0000066) inch/inch/° F. The Tc of 304 stainless steel (SS) in the annealed condition at 900° F. is $10.2\times10^{-6}$ inch/inch/° F. The yield stress of the 304SS material is 45,000 psi. When the sensor 20 is heated to 900° F., the diaphragm stress is equal to 82,440 psi, which is almost twice the yield stress of the 304SS material of the body members 24 and 26.

When the diaphragm 64 is made from 17-4 PHSS material, the maximum allowable difference between the coefficient of thermal expansion of the diaphragm material and that of the body member material, when the sensor 20 is to be heated to 900° F., is approximately $1.5\times10^{-6}$ inch/inch/° F. at 900° F. The maximum Tc for the material that forms the sensor bodies 24 and 26 is therefore approximately $8.1\times10^{-6}$ inch/inch/° F. at 900° F. The heat treating tensioning of a diaphragm made from a precipitation hardening metal material therefore only works effectively within a narrow range of materials used to form the body members 24 and 26 which have the appropriate matching coefficient of thermal expansion.

A mismatch between the Tc of the metal material that forms the body members 24 and 26 and the Tc of the metal material that forms the diaphragm 64 also results in an error in Span (output at full scale pressure) pressure measurement readings. The radial tensile stress in the diaphragm decreases due to a temperature increase of the sensor 20, including the body members 24 and 26 and the diaphragm 64, by approximately 3.3% per 100° F. increase in temperature of the sensor when the diaphragm is made from 17-4 PHSS material and the body members are made from 430SS material. In addition, there is a 1.5% decrease in diaphragm radial stiffness per 100° F. temperature increase caused by the change in the Modulus of Elasticity, such that the total Span change is approximately 4.8% per 100° F. temperature increase of the sensor. When the sensor 20 is cooled, the diaphragm radial stress and radial stiffness will increase by approximately the same magnitude. An electrical signal conditioning circuit can offset or correct pressure reading output errors due to changes in temperature of the sensor typically in the range of less than 8% per 100° F. Therefore, a mismatch in the thermal coefficients of expansion of the body member material and the diaphragm material of $0.2 \times 10^{-6}$ inch/inch/° F. to $0.4 \times 10^{-6}$ inch/inch/° F. (5–8% per 100° F.) is approximately the maximum practical mismatch in Tc that can be compensated for by conventional transducer electronics without risking poor thermal transient performance.

The material which forms the body members 24 and 26 is preferably stampable and machinable at low cost. The material is also preferably ferromagnetic to shield the diaphragm 64, which is magnetic, from external magnetic fields which may cause false pressure readings. Ferromagnetic materials respond strongly to a magnetic field and have high magnetic permeability. The material should also be easily weldable using tungsten inert gas (TIG) or laser methods and should sustain heat treating temperatures without corrosion or oxidation. Neither should the material harden or change metallurgical conditions when exposed to heat treating temperatures. The metal material from which the body members 24 and 26 are formed preferably have a thermal coefficient of expansion (Tc) between $5.6 \times 10^{-6}$ and $6.4 \times 10^{-6}$ inch/inch/° F. at temperatures from 32° to 200° F. The body members 24 and 26 may be made from 405 SS, 430 SS, 17-7 PHSS, or Hastelloy C (a nickel alloy) metal material. The body members 24 and 26, as well as the diaphragm 64, may be made from 17-4 PHSS material, although 17-4 PHSS is not generally stampable.

The 405 SS metal material comprises: Carbon (C), up to about 0.08 wt %; Maganese (Mn), up to about 1.00 wt %; Phosphorus (P), up to about 0.04 wt %; Sulphur (S), up to about 0.03 wt %; Silicon (Si), up to about 1.00 wt %; chromium (Cr), 11.50–14.50 wt %; aluminum (Al), 0.10–0.30 wt %; and the remainder iron (Fe). The 405 SS material has a Tc of approximately $6.0 \times 10^{-6}$ inch/inch/° F. at 32°–212° F. The 405 SS material is ferromagnetic.

The 430 SS material comprises: C, up to about 0.12 wt %; Mn, up to about 1.00 wt %; P, up to about 0.040 wt %; S, up to about 0.030 wt %; Si, up to about 1.00 wt %; Cr, 16.0–18.0 wt %; nickel (Ni), up to about 0.50 wt %; and the remainder Fe. The 430 SS material has a Tc of approximately $5.8 \times 10^{-6}$ inch/inch/° F. at 32°–212° F. The 430 SS material is ferromagnetic.

The 17-4 PHSS material comprises: C, up to about 0.07 wt %; Mn, up to about 1.00 wt %; P, up to about 0.040 wt %; S, up to about 0.030 wt %; Si, up to about 1.00 wt %; Cr, 15.00–17.50 wt %; Ni, 3.00–5.00 wt %; copper (Cu), 3.00–5.00 wt %; columbium (Nb) plus tantalum (Ta), 0.15–0.45 wt %; and the remainder Fe. The Tc of the 17-4 PHSS material is approximately $6.0 \times 10^{-6}$ inch/inch/° F. at 70°–200° F. in the H900 heat-treated condition. The 17-4 PHSS material is ferromagnetic.

The 17-7 PHSS material comprises: C, up to about 0.09 wt %; Mn, up to about 1.00 wt %; P, up to about 0.040 wt %; S, up to about 0.030 wt %; Si, up to about 1.00 wt %; Cr, 16.00–18.00 wt %; Ni, 6.50–7.75 wt %; Al, 0.75–1.50 wt %; and the remainder Fe. The Tc of the 17-7 PHSS material is approximately $5.6 \times 10^{-6}$ inch/inch/° F. at 70°–200° F. for the TH 1050 condition and $5.7 \times 10^{-6}$ inch/inch/° F. at 70°–200° F. for the RH 950 condition. The 17-7 PHSS material is ferromagnetic.

The Hastelloy C material comprises: molybdenum (Mo), 16 wt %; Cr, 16 wt %; Fe, 5 wt %; tungsten (W), 4 wt %, and the remainder Ni. The Tc of the Hastelloy C material is $6.3 \times 10^{-6}$ inch/inch/° F. at 32°–212° F. The Hastelloy C material is not ferromagnetic, but provides very good matching coefficients of thermal expansion.

FIGS. 3 and 4 show another embodiment of the pressure sensor of the present invention identified with the reference number 120. The pressure sensor 120 includes a central axis 121 and a housing 122. The housing 122 includes a first body member 124 and a second body member 126. The first body member 124 is constructed in the same manner as the first body member 24 of the pressure sensor 20. The first body member 124 includes an annular flange 128 having a generally circular peripheral edge 130. The first body member 124 also includes a central aperture 132 and a port 134 that extends through the first body member 124.

The second body member 126 includes a generally annular flange 140 having a generally circular peripheral edge 142. The second body member 126 also includes a generally circular wall 144 located generally concentrically within the flange 140. The wall 144 includes a port 146 that extends through the second body member 126. The wall 144 is generally planar and is located in a plane that is spaced apart from and generally parallel to the plane that contains the flange 140. The first and second body members 124 and 126 are both formed from the same type of metal material and are both stamped from metal sheets into their final form.

The pressure sensor 120 includes a flexible and generally planar thin metal diaphragm 150 having a generally circular peripheral edge 152. The diaphragm 150 is disposed between the flange 128 of the first body member 124 and the flange 140 of the second body member 126. The diaphragm 150 is connected to the flanges 128 and 140 in a fluid-tight seal by welding or the like. The pressure sensor 120 includes a first chamber 156 located between the first body member 124 and the diaphragm 150 which is in fluid communication with the port 134, and a second chamber 158 which is located between the second body member 126 and the diaphragm 150 which is in fluid communication with the port 146.

The pressure sensor 120 includes an electrode 162 located within the first chamber 156 which is attached to the first body member 124 by a mounting arrangement 164. The mounting arrangement 164 is constructed in the same manner as the mounting arrangement 80 and attaches the electrode 162 to the first body member 124 in a similar manner. The electrode 162 includes a generally planar surface that is spaced apart a short distance from, and generally parallel to, the diaphragm 150. The electrode 162 senses movement of the diaphragm 150 by capacitance measurement methods, as are well known in the art, in a direction generally parallel to the axis 121 in response to a fluid pressure differential between the chambers 156 and 158. The body members 124 and 126, and the diaphragm 150, of the sensor 120 are heat treated, assembled and made of the same materials as in the sensor 20.

Figure 5:
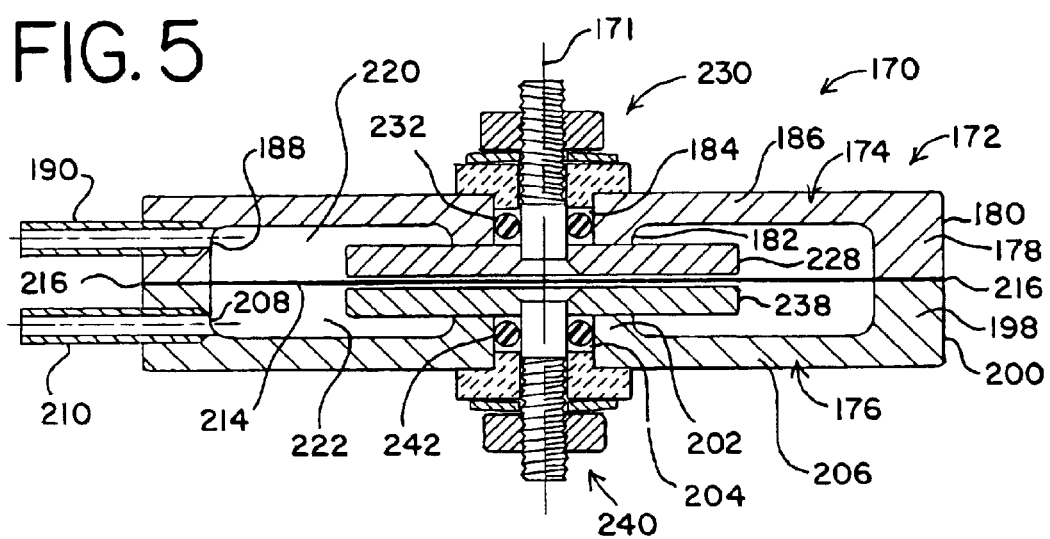
FIG. 5 is a cross sectional view of the further embodiment of the pressure sensor of the present invention including two electrodes.
Figure 6:
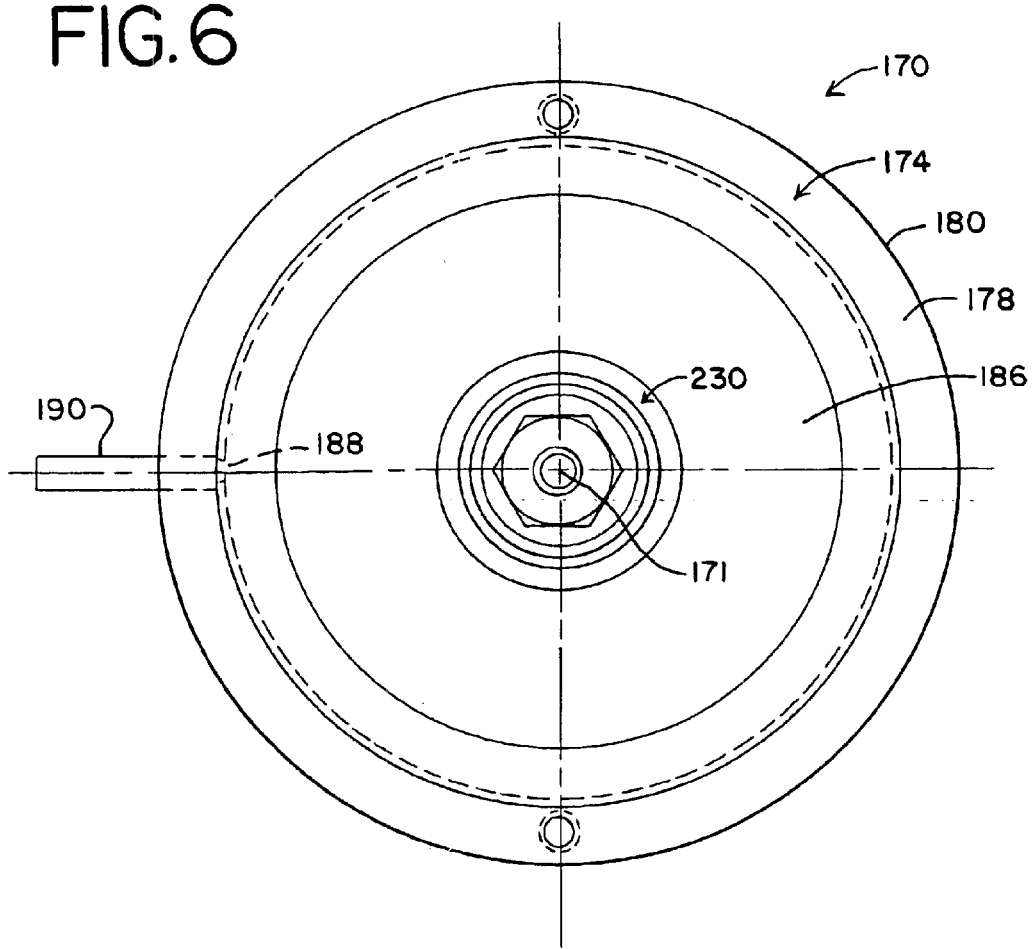
FIG. 6 is a top plan view of the pressure sensor of FIG. 5.

FIGS. 5 and 6 show a further embodiment of a pressure sensor of the present invention identified with the reference number 170. The pressure sensor 170 includes a central axis 171 and a housing 172. The housing 172 includes a first body member 174 and second body member 176. The first body member 174 includes a generally annular flange 178 having a generally circular peripheral edge 180. The first body member 174 also includes a central disc 182 having a central aperture 184. The central disc 182 and central aperture 184 are concentrically located about the axis 171. The first body member 174 also includes a generally planar wall portion 186 which extends concentrically about the central aperture 184 and which extends from the central aperture 184 to the flange 178. The first body member 174 includes a port 188. The housing 172 also includes a generally tubular nozzle 190 having a first end that is in fluid communication with the port 188 and a second end that is adapted to be attached in fluid communication with a supply of fluid, such as a gas.

The second body member 176 includes an annular flange 198 having a generally circular peripheral edge 200. The second body member 176 is constructed in the same manner as the first body member 174. The second body member 176 also includes a central disc 202 having a central aperture 204. The second body member 176 also includes a generally planar wall portion 206 which extends concentrically about the central aperture 204 and which extends from the central aperture 204 to the annular flange 198. The second body member 176 includes a port 208 and a generally tubular nozzle 210 having a first end in fluid communication with the port 208 and a second end adapted to be placed in fluid communication with a supply of a second fluid, such as a gas.

The pressure sensor 170 includes a generally planar and flexible thin metal diaphragm 214 having a generally circular peripheral edge 216. The diaphragm is made of 17-4 PHSS metal material. The diaphragm 214 is disposed between the flanges 178 and 198 of the first and second body members 174 and 176, and is attached along the peripheral edge 216 to the flanges 178 and 198 to create a fluid-tight seal therebetween by welding or the like. The pressure sensor 170 includes a first chamber 220 located between the first body member 174 and the diaphragm 214, and a second chamber 222 located between the second body member 176 and the diaphragm 214. The first and second body members 174 and 176 are preferably fabricated from 17-4 precipitation hardened stainless steel (PHSS) which is not readily stampable or formable. The body members 174 and 176 are therefore fabricated by machining the body members from a disk or bar of the 17-4 PHSS metal material.

The pressure sensor 170 includes a first electrode 228 located within the first chamber 220. The first electrode 228 is attached to the first body member 174 by a mounting arrangement 230 which is constructed and which operates in the same manner as the mounting arrangement 80. A resilient elastomeric gasket 232, such as an O-ring, extends around the mounting stud of the mounting arrangement 230, and is located within the aperture 184 of the first body member 174, to create a fluid-tight seal between the mounting stud and the first body member 174. The mounting arrangement 230 attaches the electrode 228 to the central disc 182 of the first body member 174 such that a generally planar surface of the electrode 228 is spaced apart a short distance from, and generally parallel to, the diaphragm 214.

The pressure sensor 170 includes a second electrode 238 located within the second chamber 222. The second electrode 238 is attached to the second body member 176 by a mounting arrangement 240 which is constructed and operates in the same manner as the mounting arrangement 230. A resilient elastomeric gasket 242, such as an O-ring, extends around the mounting stud of the mounting arrangement 240 and is located within the aperture 204 of the second body member 176 to create a fluid-tight seal therebetween. The second electrode 238 is mounted against the central disc 202 of the second body member 176 such that a generally planar surface of the electrode 238 is spaced apart a short distance from, and generally parallel to, the diaphragm 214. The diaphragm 214 is thereby located between the first and second electrodes 228 and 238. The electrodes 228 and 238 sense movement of the diaphragm 214 in a direction generally parallel to the axis 171 which is indicative of the pressure differential between the pressure of the fluid within the first chamber 220 and the pressure of the fluid within the second chamber 222.

The 17-7 PHSS material is stampable and therefore may be used to stamp the body members as shown in the embodiments of FIGS. 1–4. However, the 17-4 PHSS material is not generally stampable and must be machined. In addition, sensor body members made of 17-4 PHSS material must be pre-heat treated, or preshrunk, to a condition up to the H1150 condition, or 1150° F., and preferably to the H1000 condition, or 1000° F., before machining so that the body members 174 and 176 will not shrink when the sensor 170 is heat treated to the diaphragm heat treatment temperature of 900° F. If the body members 174 and 176 and the diaphragm 214 are all made of 17-4 PHSS material in the annealed condition, they will shrink the same amount during heat treatment and no diaphragm radial tension will result. Therefore, the sensor bodies 174 and 176 are pre-heat treated up to approximately 1150° F. to the H1150 condition, and preferably to approximately 1000° F. for approximately four hours to the H1000 condition. The pre-heat treated, or pre-aged, body members are then attached to the diaphragm 214 made of annealed 17-4 PHSS material. The assembled sensor 170 is then heat treated to approximately 900° F. for one hour to shrink the diaphragm 214 with respect to the body members 174 and 176 and thereby radially tension the diaphragm.

The compensation or nulling of the Span thermal error, when the body members 174 and 176 and diaphragm 214 are made of 17-4 PHSS material, can be accomplished by heat treating the body members 174 and 176 at a temperature slightly higher than the diaphragm heat treatment shrink temperature because the Tc of the 17-4 PHSS material increases with aging or heat treatment temperature. At the H900 condition the Tc of 17-4 PHSS is approximately $6.0 \times 10^{-6}$ inch/inch/° F., at the H1000 condition the Tc is approximately $6.2 \times 10^{-6}$ inch/inch/° F., at the H1050 condition the Tc is approximately $6.3 \times 10^{-6}$ inch/inch/° F., and at the H1150 condition the Tc is approximately $6.6 \times 10^{-6}$ inch/inch/° F., all at 70°–200° F. If the sensor body members expand approximately 2% per 100° F. more than the diaphragm in a hot environment, then the diaphragm radial tensile stress is increased by the same amount as the decrease in radial stiffness caused by the change in the Modulus of Elasticity, resulting in a Span thermal error of zero. Thus Span temperature performance of a tension diaphragm sensor can be calibrated by variably adjusting the heat treatment process.

A further embodiment of the pressure sensor of the present invention is shown in FIGS. 7 and 8 and is identified with reference number 250. The pressure sensor 250 includes a central axis 251 and a housing 252. The housing 252 includes a first body member 254 and a second body member 256. The first body member 254 is constructed in the same manner as the first body member 174 in FIG. 5. The first body member 254 includes a generally annular flange 258 having a generally circular peripheral edge 260. The first body 254 includes a central aperture 262 and a port 264 that extends through the first body member 254. The first body member 254 includes a tubular nozzle 266 having a first end in fluid communication with the port 264 and a second end that is adapted to be attached in fluid communication with a supply of a first fluid, such a gas.

The second body member 256 includes a generally annular flange 270 having a generally circular peripheral edge 272. The second body member 256 also includes a generally planar wall portion 274 which is located generally concentrically about the axis 251. The wall 274 includes a port 276 which is located on the axis 251. The first body member 254 and the second body member 256 are both preferably formed from 17-4 PHSS metal.

The pressure sensor 250 includes a flexible and generally planar thin metal diaphragm 280 having a generally circular peripheral edge 282. The diaphragm 280 is preferably formed 17-4 PHSS metal. The diaphragm 280 is disposed between the flange 258 of the first body member 254 and the flange 270 of the second body member 256 and is connected to the flanges 258 and 270 along the peripheral edge 282 by a weld or the like to create a fluid-tight seal. The pressure sensor 250 includes a first chamber 286 located between the first body member 254 and the diaphragm 280, and a second chamber 288 located between the second body member 256 and the diaphragm 280.

The pressure sensor 250 includes an electrode 292 located in the first chamber 286. The electrode 292 is attached to the central disc of the first body member 254 by a mounting arrangement 294. The mounting arrangement 294 is constructed and operates in the same manner as the mounting arrangement 230 in FIG. 5. The electrode 292 includes a generally planar surface that is spaced apart a short distance from, and generally parallel to, the diaphragm 280. The electrode 292 is adapted to sense movement of the diaphragm 280 in a direction generally parallel to the axis 251 of the pressure sensor 250. The body members 254 and 256, and the diaphragm 280, of the sensor 250 are heat-treated, assembled, and made of the same materials as in the sensor 170.

Various features of the invention have been particularly shown and described in connection with the illustrated embodiments of the invention, however, it must be understood that these particular arrangements merely illustrate, and that the invention is to be given its fullest interpretation within the terms of the appended claims.

What is claimed is:

1. A pressure sensor for measuring fluid pressure, said pressure sensor including:
    a first body member;
    a second body member; and
    a radially tensioned flexible diaphragm disposed between said first body member and said second body member, said first body member and said diaphragm forming a first fluid chamber, said second body member and said diaphragm forming a second fluid chamber;
    said first body member being formed from a first material having a first coefficient of thermal expansion, said diaphragm being formed from a second material having a second coefficient of thermal expansion, wherein said first coefficient of thermal expansion is not greater than said second coefficient of thermal expansion by more than approximately 0.0000015 inch/inch/° F.

2. The pressure sensor of claim 1 wherein said second coefficient of thermal expansion of said second material that forms said diaphragm is approximately 0.0000060 inch/inch/° F.

3. The pressure sensor of claim 1 wherein said second material that forms said diaphragm comprises a precipitation hardening material.

4. The pressure sensor of claim 3 wherein said precipitation hardening material comprises: C, up to about 0.07 wt %; Mn, up to about 1.00 wt %; P, up to about 0.040 wt %; S, up to about 0.030 wt %; Si, up to about 1.00 wt %; Cr, 15.00–17.50 wt %; Ni, 3.00–5.00 wt %; Cu, 3.00–5.00 wt %; Nb plus Ta, 0.15–0.45 wt %; and the remainder Fe.

5. The pressure sensor of claim 1 wherein said first coefficient of thermal expansion of said first material that forms said first body member is from approximately 0.0000056 inch/inch/° F. to approximately 0.0000064 inch/inch/° F.

6. The pressure sensor of claim 1 wherein said first material that forms said first body member is a precipitation hardening material.

7. The pressure sensor of claim 1 wherein said first material that forms said first body member comprises: C, up to about 0.08 wt %; Mn, up to about 1.00 wt %; P, up to about 0.04 wt %; S, up to about 0.03 wt %; Si, up to about 1.00 wt %; Cr, 11.50–14.50 wt %; Al, 0.10–0.30 wt %; and the remainder Fe.

8. The pressure sensor of claim 1 wherein said first material that forms said first body member comprises: C, up to about 0.12 wt %; Mn, up to about 1.00 wt %; P, up to about 0.040 wt %; S, up to about 0.030 wt %; Si, up to about 1.00 wt %; Cr, 16.0–18.0 wt %; Ni, up to about 0.50 wt %; and the remainder Fe.

9. The pressure sensor of claim 1 wherein said first material that forms said first body member comprises: C, up to about 0.09 wt %; Mn, up to about 1.00 wt %; P, up to about 0.040 wt %; S, up to about 0.030 wt %; Si, up to about 1.00 wt %; Cr, 16.00–18.00 wt %; Ni, 6.50–7.75 wt %; Al, 0.75–1.50 wt %; and the remainder Fe.

10. The pressure sensor of claim 1 wherein said first material that forms said first body member comprises: C, up to about 0.07 wt %; Mn, up to about 1.00 wt %; P, up to about 0.040 wt %; S, up to about 0.030 wt %; Si, up to about 1.00 wt %; Cr, 15.00–17.50 wt %; Ni, 3.00–5.00 wt %; Cu, 3.00–5.00 wt %; Nb plus Ta, 0.15–0.45 wt %; and the remainder Fe.

11. The pressure sensor of claim 1 wherein said first material that forms said first body member comprises: Mo, 16 wt %; Cr, 16 wt %; Fe, 5 wt %; W, 4 wt %, and the remainder Ni.

12. The pressure sensor of claim 1 wherein said first coefficient of thermal expansion of said first material is not greater than said second coefficient of thermal expansion of said second material by more than approximately 0.0000004 inch/inch/° F.

13. The pressure sensor of claim 1 wherein said first coefficient of thermal expansion of said first material is not greater than said second coefficient of thermal expansion of said second material by more than approximately 0.0000002 inch/inch/° F.

14. A pressure sensor for measuring fluid pressure, said pressure sensor including:
    a first body member;
    a second body member; and
    a radially tensioned flexible diaphragm disposed between said first body member and said second body member, said first body member and said diaphragm forming a first fluid chamber, said second body member and said diaphragm forming a second fluid chamber;
    said first body member and said second body member being formed from a ferromagnetic material such that said first and second body members shield said diaphragm from magnetic fields which may otherwise cause movement of said diaphragm resulting in an inaccurate measurement of the fluid pressure applied to said diaphragm.

15. The pressure sensor of claim 14 wherein said ferromagnetic material comprises: C, up to about 0.08 wt %; Mn, up to about 1.00 wt %; P, up to about 0.04 wt %; S, up to about 0.03 wt %; Si, up to about 1.00 wt %; Cr, 11.50–14.50 wt %; Al, 0.10–0.30 wt %; and the remainder Fe.

16. The pressure sensor of claim 14 wherein said ferromagnetic material comprises: C, up to about 0.12 wt %; Mn, up to about 1.00 wt %; P, up to about 0.040 wt %; S, up to about 0.030 wt %; Si, up to about 1.00 wt %; Cr, 16.0–18.0 wt %; Ni, up to about 0.50 wt %; and the remainder Fe.

17. The pressure sensor of claim 14 wherein said ferromagnetic material comprises: C, up to about 0.09 wt %; Mn, up to about 1.00 wt %; P, up to about 0.040 wt %; S, up to about 0.030 wt %; Si, up to about 1.00 wt %; Cr, 16.00–18.00 wt %; Ni, 6.50–7.75 wt %; Al, 0.75–1.50 wt %; and the remainder Fe.

18. The pressure sensor of claim 14 wherein said ferromagnetic material comprises: C, up to about 0.07 wt %; Mn, up to about 1.00 wt %; P, up to about 0.040 wt %; S, up to about 0.030 wt %; Si, up to about 1.00 wt %; Cr, 15.00–17.50 wt %; Ni, 3.00–5.00 wt %; Cu, 3.00–5.00 wt %; Nb plus Ta, 0.15–0.45 wt %; and the remainder Fe.

19. A pressure sensor for measuring fluid pressure, said pressure sensor including:
  a first metal body member and a second metal body member, said first and second body members being heat treated to greater than 900° F.;
  a flexible metal diaphragm disposed between said first and second body members, said diaphragm being in an annealed condition and formed from a precipitation hardening material, said first body member and said diaphragm forming a first fluid chamber, and said second body member and said diaphragm forming a second fluid chamber.

20. The pressure sensor of claim 19 wherein said diaphragm is heat treated to approximately 900° F. after said diaphragm is disposed between said first and second body members.

* * * * *